Dec. 23, 1941.   W. A. RAY   2,267,215
CONTROL SYSTEM
Original Filed Jan. 21, 1937
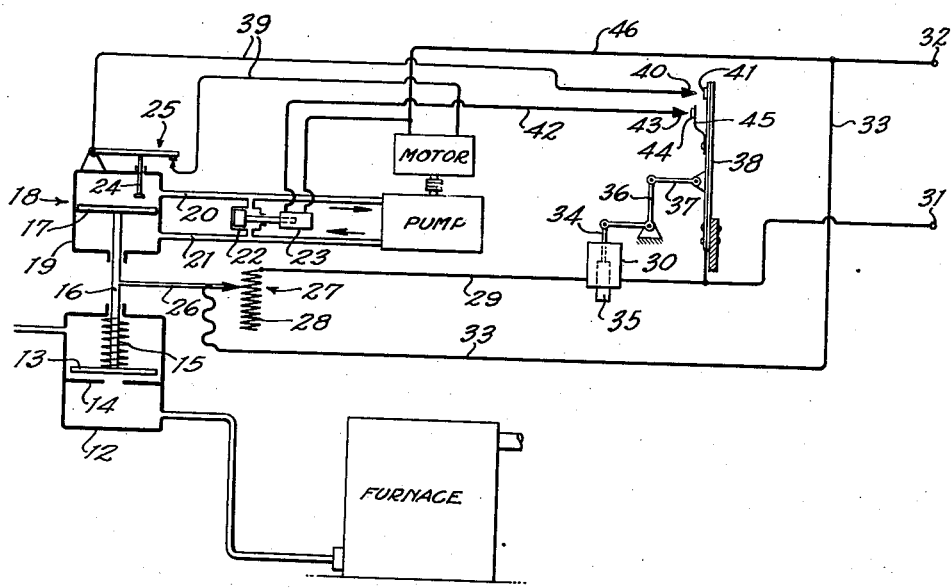
WILLIAM A. RAY,
INVENTOR.
BY John H. Rouse,
ATTORNEY Patented Dec. 23, 1941

2,267,215

UNITED STATES PATENT OFFICE 2,267,215

CONTROL SYSTEM

William A. Ray, Glendale, Calif.

Original application January 21, 1937, Serial No. 121,575. Divided and this application June 25, 1940, Serial No. 342,333

7 Claims. (Cl. 236—74)

My present invention relates to condition control systems, and particularly to a modulating system wherein a member, movable to a plurality of positions for variably controlling a condition, such as temperature, pressure, or the like, is positioned in accordance with the existing variation of the condition from a predetermined value.

It is an object of this invention to provide means for accurately so positioning a condition-controlling member when the means employed for moving the member is in the form of a liquid-pressure operated motor. Such a motor comprises a chamber provided with a movable wall or partition (as a piston, bellows, or diaphragm) which is biased in one direction of movement and is movable in the opposite direction against the bias by the pressure of liquid pumped into the chamber. Movement of the partition under the influence of the bias is effected by opening a relief valve, connected to the pressure chamber, to reduce the liquid pressure therein.

It is a further object to provide simple, dependable and effective means for accomplishing the above-stated object.

Other objects and advantages of my invention will be found in the description, the drawing, and the appended claims.

This application is a division of my copending application, Serial No. 121,575, filed January 21, 1937.

For complete understanding of the invention, reference may be had to the following detailed description and accompanying drawing, wherein the single figure is a diagrammatic view of a heating control system embodying my present invention.

In the drawing, indicated by the legend is a gas-consuming furnace, fuel supply to which is controlled by a modulating valve 12, which comprises a valve member 13 cooperable with a valve seat 14 and biased theretoward by a compression spring 15. The stem 16 of the valve member is connected at its upper end to the piston 17 of a liquid-pressure operated motor 18 which comprises a cylinder 19, the upper and lower ends of which are respectively connected by pipes 20 and 21 to a liquid pump, driven by an electric motor, both of these devices being indicated by legends. The pump may be of any conventional type adapted to circulate, only in the direction of the arrows, the liquid (preferably, oil) with which the areas above and below the piston 17 are filled.

The pipes 20 and 21 are interconnected by a normally-open relief valve 22 operated by a solenoid 23. Upon energization of this solenoid, the relief valve closes and, if the pump motor is then also energized, the piston is forced upward by the liquid. If the pump is then stopped, the piston remains in its elevated position as the liquid cannot flow in the opposite direction through the pump, nor through the closed relief valve. If, however, the solenoid is now deenergized, the piston moves downward under the influence of spring 15, the liquid passing from the area below the piston to the area above it through the open relief valve.

The arm 24 of a normally-closed switch 25 is positioned so as to be engaged (and the switch thus opened) by the piston 17 in its upward movement. This switch is connected in the pump motor circuit and therefore is effective to limit upward movement of the piston.

Carried by the valve stem 16 is the contact arm 26 of a rheostat 27 comprising a resistance winding 28. In the movement of the valve stem, the resistance of the rheostat is varied, it being maximum when the valve 12 is closed and minimum when the valve is in its full-open position (as governed by the upward limit of travel of the piston 17). The rheostat is connected by a wire 29, through the coil of a solenoid 30, to the terminal 31 of terminals 31 and 32 provided for the connection of a convenient source of electrical energy; the other power terminal 32 being connected by a wire 33 directly to the rheostat. The stem 34 of the solenoid plunger 35 is connected by a bell crank 36 and link 37 to a bimetallic member 38. The solenoid plunger is so arranged with respect to its coil that, when energized, its force is upward, tending to flex the bimetallic member in a clockwise direction.

One lead of the pump motor is connected by wires 39, through switch 25, to a fixed contact 40 with which a contact 41, carried by the bimetallic member, cooperates. One lead of the relief-valve solenoid 23 is connected by a wire 42 to another fixed contact 43, cooperable with a contact 44 carried by a flexible arm 45, secured to the bimetallic member. The other lead of the pump motor and of the relief-valve solenoid are connected together and, by a wire 46, to the power terminal 32. The bimetallic member being connected to wire 29 which extends from the other power terminal 31, it will thus be seen that the relief-valve solenoid is energized when contacts 43—44 engage; and that the pump motor is energized (if switch 25 is in its normal closed condition) when contacts 40—41 engage.

The operation of the control system will now be described; it being assumed that the bimetallic member or thermostat 38 is located in a space heated by the furnace and that it is arranged to warp toward contact-closing position upon fall of temperature.

Assuming further that heating is discontinued at night and that, when the system is put into operation in the morning, the temperature of the space is considerably below that for which the thermostat is set, both pairs of contacts 40—41 and 43—44 therefore being tightly closed, both the pump motor and the relief-valve solenoid are energized, with the result that the piston 17 is raised by the circulated liquid to a position at which it opens switch 25, stopping the pump. The relief valve being closed, the piston remains in elevated position holding the fuel supply valve member 13 fully open. The resistance of rheostat 27 now being at its minimum value, maximum force tending to open contacts 40—41 and 43—44 is exerted on the bimetal by the solenoid 30. However, the force produced by this solenoid is not sufficient to open the contacts under the present cold condition of the space, this force being relatively weak and approximately equal to the effect of a change in temperature of the thermostat of 2-4 degrees. In industrial applications, the biasing or "false temperature" effect of the solenoid may be considerably greater. Obviously, means other than those disclosed herein could be provided for variably biasing the thermostat according to the valve position; as an extreme example: a spring directly interconnecting the bimetallic member and the valve stem.

As the temperature of the space accordingly rises, when it is a few degrees below the desired temperature for which the thermostat is set, the force of the solenoid opens contacts 40—41, the contacts 43—44 remaining in engagement with the arm 45 flexed inwardly. But, as the motor circuit is already open at switch 25, no change in operation occurs. Upon further rise of space temperature, the contacts 43—44 also open, de-energizing the relief-valve solenoid and thus permitting the liquid to circulate so that the piston starts to fall. However, the resulting decrease in solenoid force applied to the bimetal (caused by the increased resistance of the rheostat) effects reclosure of contacts 43—44 and the relief-valve closes, halting the piston in a slightly lowered position. If the space temperature continues to rise, contacts 43—44 again open and the piston falls to a still lower position before it is checked by the change in thermostat bias. With the piston in this position (the fuel supply valve being partly closed) moderate heating of the space results. If the reduced heating rate is not sufficient to compensate for heat losses in the space and its temperature accordingly falls, contacts 40—41 engage, energizing the pump motor so that the piston starts to rise. However, as this occurs, contacts 40—41 are reopened by the resulting increased force exerted on the bimetallic member by the solenoid and the piston is halted in its raised position.

The fuel supply valve is thus positioned in accordance with the heating requirements of the space. In normal operation, the valve may continue to move upward and downward within its modulating range, and only reach its full-open position if the space is subjected to excessive cooling. Obviously, if the temperature of the space rises above that for which the thermostat is set, both pairs of thermostat contacts open and heating is discontinued. However, in normal winter operation of the system, this may not occur as "over-run" of the furnace is effectively prevented. In the fully-closed position of the fuel supply valve, the resistance of the rheostat is such that no material force is exerted on the thermostat by the solenoid; thus, as the space cools, the thermostat closes the contacts at the true temperature for which it is set. Upon initial engagement of contacts 43—44, the relief-valve is conditioned for the subsequent operation of the liquid-pressure motor when contacts 40—41 additionally engage.

While I have described my invention as applied to the control of a heating system, it is obviously not so limited, as changes within the scope of one skilled in the art may be made to effect the control of other condition-changing systems, such as, for instance, a cooling, super-heat, humidifying, pressure, speed, or liquid-level system. For example, in a liquid-level system, a float could be provided with sequential circuit-controlling means, similar to those of the thermostat in the heating system illustration, for controlling, by electrically controlled liquid-pressure-motor-operated valve positioning means cooperating with the circuit controlling means, the rate of liquid flow in accordance with the variation of the liquid from a predetermined level. In a speed control system, the circuit controlling means could be associated with a governor.

I wish it to be understood that still other modifications may be made without departing from the spirit of my invention and that I intend therefore to be limited only by the scope of the appended claims.

I claim as my invention:

1. In combination: means for changing a condition; a member movable in opposite directions between limiting positions, and capable of assuming a plurality of other positions intermediate thereof, for varying the operation of said condition changing means; liquid pressure operated means, including an electrically operated pump, for moving said member in one of said directions; means biasing said member in the other of said directions; electrically operated valve means for relieving the liquid pressure applied to said moving means whereby the member is moved by said bias; means movable in response to change in said condition for sequentially controlling the energization of said relief valve and said pump; and means interconnecting said movable member and said condition responsive means for variably biasing the latter in accordance with the position of the former.

2. In combination: means for changing a condition; a member movable in opposite directions between limiting positions, and capable of assuming a plurality of other positions intermediate thereof, for varying the operation of said condition changing means; liquid pressure operated means, including an electrically operated pump, for moving said member in one of said directions; means biasing said member in the other of said directions; electrically operated valve means adapted, when unenergized, to relieve the liquid pressure applied to said moving means whereby the member is moved by said bias; means movable in response to change in said condition; switching means, actuated by the movement of said condition responsive means, for sequentially effecting energization of said relief valve and said pump; and means interconnecting said movable member and said condition responsive means for variably biasing the latter in accordance with the position of the former.

3. In combination: means for changing a condition; a member movable in opposite directions between limiting positions, and capable of assuming a plurality of other positions intermediate thereof, for varying the operation of said condition changing means; liquid pressure operated means, including an electrically operated pump, for moving said member in one of said directions; means biasing said member in the other of said directions; electrically operated valve means adapted, when unenergized, to relieve the liquid pressure applied to said moving means whereby the member is moved by said bias; means movable in response to change in said condition; first switching means, actuated by the movement of said condition responsive means in one direction, for effecting energization of said relief valve; second switching means, additionally actuated by subsequent movement of the condition responsive means in said one direction, for effecting energization of said pump; and means interconnecting said movable member and said condition responsive means for variably biasing the latter in accordance with the position of the former.

4. In combination: means for changing the temperature of a space; a member movable in opposite directions between limiting positions, and capable of assuming a plurality of other positions intermediate thereof, for varying the operation of said temperature changing means; liquid pressure operated means, including an electrically operated pump, for moving said member in one of said directions; means biasing said member in the other of said directions; electrically operated valve means for relieving the liquid pressure applied to said moving means whereby the member is moved by said bias; means in said space, and movable in response to changes in the temperature thereof, for sequentially controlling the energization of said relief valve and said pump; and means interconnecting said movable member and said space temperature responsive means for variably biasing the latter in accordance with the position of the former.

5. In combination: means for changing the temperature of a space; a member movable in opposite directions between limiting positions, and capable of assuming a plurality of other positions intermediate thereof, for varying the operation of said temperature changing means; liquid pressure operated means, including an electrically operated pump, for moving said member in one of said directions; means biasing said member in the other of said directions; electrically operated valve means adapted, when unenergized, to relieve the liquid pressure applied to said moving means whereby the member is moved by said bias; means in said space and movable in response to changes in the temperature thereof; switching means, actuated by the movement of said space temperature responsive means, for sequentially effecting energization of said relief valve and said pump; and means interconnecting said movable member and said space temperature responsive means for variably biasing the latter in accordance with the position of the former.

6. In combination: means for changing the temperature of a space; a member movable in opposite directions between limiting positions, and capable of assuming a plurality of other positions intermediate thereof, for varying the operation of said temperature changing means; liquid pressure operated means, including an electrically operated pump, for moving said member in one of said directions; means biasing said member in the other of said directions; electrically operated valve means adapted, when unenergized, to relieve the liquid pressure applied to said moving means whereby the member is moved by said bias; means in said space and movable in response to changes in the temperature thereof; first switching means, actuated by the movement of said space temperature responsive means in one direction, for effecting energization of said relief valve; second switching means, additionally actuated by subsequent movement of the temperature responsive means in said one direction, for effecting energization of said pump; and means interconnecting said movable member and said space temperature responsive means for variably biasing the latter in accordance with the position of the former.

7. In combination: means for heating a space; a member movable in opposite directions between limiting positions, and capable of assuming a plurality of other positions intermediate thereof, for varying the operation of said heating means; liquid pressure operated means, including an electrically operated pump, for moving said member in such direction as to increase the temperature of the space; means biasing said member in an opposite direction; electrically operated valve means adapted, when unenergized, to relieve the liquid pressure applied to said moving means whereby the member is moved by said bias; means in said space and movable in response to changes in the temperature thereof; first switching means, actuated, upon fall of temperature in said space, by the movement of said temperature responsive means, for effecting energization of said relief valve; second switching means, additionally actuated, upon continued fall of space temperature, by continued movement of the temperature responsive means, for effecting energization of said pump; and means interconnecting said movable member and said space temperature responsive means for variably biasing the latter, in a direction opposed to that of the force produced therein by fall of temperature, in accordance with the position of the former; the force of the last-named bias being maximum when the movable member is in a position such that maximum space heating results.

WILLIAM A. RAY.